United States Patent [19]

Ogawa et al.

[11] 4,050,800
[45] Sept. 27, 1977

[54] DEVICE FOR SUCCESSIVE REPRODUCTION OF INFORMATION

[75] Inventors: Hiroshi Ogawa; Masao Ariga, both of Kawasaki, Japan

[73] Assignee: Canan Kabushiki Kaisha, Tokyo, Japan

[21] Appl. No.: 650,042

[22] Filed: Jan. 19, 1976

[30] Foreign Application Priority Data

Jan. 30, 1975 Japan .................................. 50-12863
July 16, 1975 Japan .................................. 50-87027

[51] Int. Cl.² ............................................. G03B 27/62
[52] U.S. Cl. ........................................ 355/75; 355/43; 355/51; 355/65
[58] Field of Search ...................... 355/75, 74, 43, 39, 355/51, 65, 8, 40, 71

[56] References Cited

U.S. PATENT DOCUMENTS

| | | | |
|---|---|---|---|
| 3,612,684 | 10/1971 | Jones et al. .......................... | 355/75 X |
| 3,642,370 | 2/1972 | Meredith et al. ...................... | 355/75 |
| 3,669,536 | 6/1972 | Scott ..................................... | 355/40 |
| 3,775,007 | 11/1973 | Davidson ............................. | 355/75 X |
| 3,880,521 | 4/1975 | Eppe et al. ............................ | 355/40 |
| 3,990,794 | 11/1976 | Nittmann .............................. | 355/75 |

*Primary Examiner*—Richard A. Wintercorn
*Attorney, Agent, or Firm*—Fitzpatrick, Cella, Harper & Scinto

[57] ABSTRACT

A device for successive reproduction of original image information to be used in a recording apparatus of a type, wherein the device includes a reciprocating table for carrying an original. The device is generally constructed with a movable table which reciprocates over the original carrying table, and on which information to be changed and selected is placed. A mechanism sequentially and automatically shifts the movable table by a driving force of the reciprocating motion of the original carrying table and thereby selectively changes the information; the shifting and changing mechanism is constructed with a plurality of mutually engaged links, wherein one of the plurality of links is displaced by the reciprocating motion of the original carrying table so as to move the movable table, and, by making variable the engaging length of at least one of the mutually engaged links, the moving distance of the movable table is made variable.

8 Claims, 14 Drawing Figures

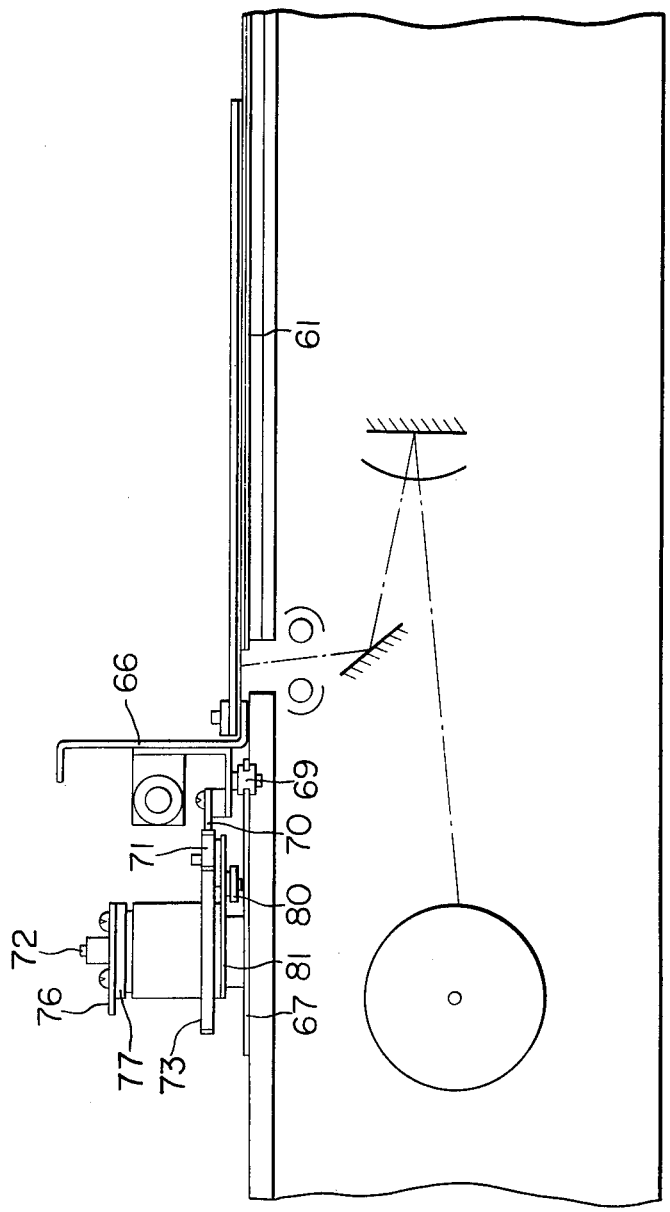

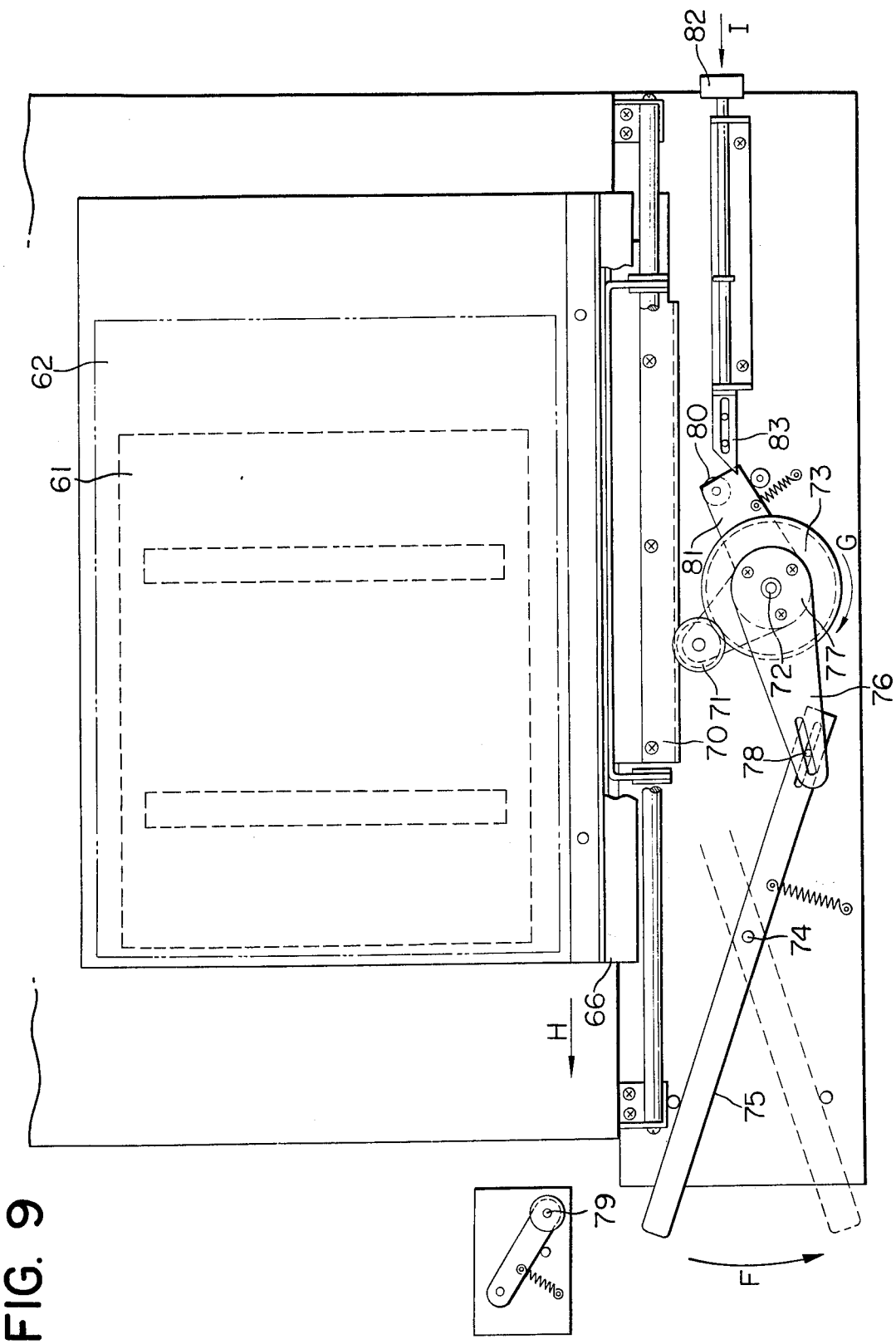

FIG. 12

SLIP

XX BANK

DATE: Feb. 1, 1975

| NAME OF BANK | NUMBER OF P.O. | NAME | AMOUNT |

CUSTOME    MESSRS. CANON

NOTE

LIST

XX BANK

DATE: Feb. 1, 1975

| NAME OF BANK | NUMBER OF P.O. | NAME | AMOUNT |

CUSTOME    MESSRS. CANON

NOTE

FIG. 13

| NAME OF BANK | NUMBER OF P.O. | NAME | AMOUNT |
|---|---|---|---|
| | LIST | | XX BANK |
| SHINBASHI | 001 | ○ ○ | 10000 |
| TAMACHI | 002 | ○ ○ | 5500 |
| SHINAGAWA | 003 | ○ ○ | 32550 |
| OSAKI | 004 | ○ ○ | 10500 |
| GOTANDA | 005 | ○ ○ | 12345 |
| MEGURO | 006 | ○ ○ | 8050 |

FIG. 14

```
                              SLIP
                                              XX BANK                —64
DATE : Feb 1, 1975

NAME          NUMBER       NAME      AMOUNT
       OF BANK        OF P.O.                                        —64a
       ┌─────────────────────────────────────────────┐
       │ SHINBASHI      001        ○  ○     10000    │
       └─────────────────────────────────────────────┘
   CUSTOME      MESSRS  CANON
   NOTE

─ ─ ─ ─ ─ ─ ─ ─ ─ ─ ─ ─ ─ ─ ─ ─ ─ ─ ─ ─ ─ ─ ─ ─   —64c

SLIP
                                              XX BANK
   DATE : Feb 1, 1975                                                —64b

NAME          NUMBER       NAME      AMOUNT
       OF BANK        OF P.O.
       ┌─────────────────────────────────────────────┐
       │ YOYOGI         008        ○  ○     33000    │
       └─────────────────────────────────────────────┘
   CUSTOME      MESSRS  CANON
   NOTE
```

DEVICE FOR SUCCESSIVE REPRODUCTION OF INFORMATION

BACKGROUND OF THE INVENTION

1. Field of the Invention

This invention relates to a device for successive reproduction of information. More particularly, it is concerned with a device which is capable of continuously preparing pro-forma slips, etc. to be used in various companies and organizations such as banks. The device uses as a driving force the reciprocating motion of a table, on which an original to be reproduced is carried, in a reproduction apparatus of a table-reciprocating-type. More specifically, the invention embodies a device which is so designed that portions of the information to be reproduced can be automatically shifted one by one, when multi-copy reproduction is to be carried out from the original information containing various different entries in the form of a list.

2. Description of the Prior Arts

In various companies and organizations such as banking corporations, it has so far been a practice to transcribe by hand or type-writer a necessary entry into a pro-forma slip, etc., taken from part of a list such as, for example, customer's names, etc., when they are issuing such pro-forma documents such as notifications, debit notes, etc. This way of preparing the pro-forma documents, however, has various disadvantages and difficulties in that errors in transcription may often happen. Much time and man-power are necessitated.

In order to eliminate such disadvantages and difficulties, mechanization in this kind of office work has been attempted in various ways, as the result of which new devices of varieties have been proposed in recent years. Most of them, however, are of a manually operated type, hence their operating efficiency is not so high as expected. Even if they are of an automatically operated type, as they utilize electric motors and other electrically operated component parts, such existing reproduction apparatuses including power sources, etc., need be re-modeled to a considerable extent, when the new automatic device is to be interconnected with the reproduction machinery.

For instance, in the case of inter-bank transactions, not only entries in pro-forma slips and various lists are different from bank to bank, but also the line space in those lists are different with the consequence that the feeding or forwarding quantity for one line space becomes non-uniform. On account of this, the circuitry for the motor, feeding quantity of ratchet wheel, and so forth must be made in conformity to the specifications of the pro-forma documents to the standard of each bank. Moreover, even in one and the same bank organization, there often exists a necessity for setting several kinds of feeding quantity for different forms, hence the known type of devices are considered to be complicated in mechanism, and troublesome in handling in point of easy conversion of the feeding or forwarding quantity for the line space.

SUMMARY OF THE INVENTION

It is therefore an object of the present invention to provide a device for successive reproductions of selected information, which is capable of simultaneously reproducing a common fixed information and an optionally changeable information.

It is another object of the present invention to provide a device for successive reproduction of information which is capable of reproducing in a successive manner a common fixed information and a selected information.

It is still another object of the present invention to provide a device for successive reproduction of information, which is capable of optionally changing a line space for the above-mentioned selected information.

It is other object of the present invention to provide a device for successive reproduction of information, which can be readily utilized for preparing pro-forma slips, etc., used in banks and other companies, organizations, etc.

It is still other object of the present invention to provide a device for successive reproduction of information, which is capable of preparing more than two kinds of pro-forma slips, etc., at the same time.

It is further object of the present invention to provide a device for successive reproduction of information, which is capable of changing the informations to be selected by means of a simple mechanism.

It is still further object of the present invention to provide a device for successive reproduction of information, which is capable of optionally changing the information to be selected by manual operations.

It is an additional object of the present invention to provide a device for successive reproduction of information, which is capable of being used as an ordinary reproduction apparatus.

That is to say, the present invention is so designed that, by utilizing the reciprocating motion of an original information carrying table of the reproduction apparatus, desired information is selected in sequence at each time of the reproduction operation to obtain the copy thereof along with the common, fixed information. Accordingly, the common information for every reproduced copies and the selectively changing information are sequentially and automatically reproduced. Further, the line space, etc., of the changing information can be arbitrarily established by varying the length of engagement of the link mechanism, etc.

The foregoing objects, other objects, and as well as the construction and functions of the device will become more apparent from the following detailed description of the present invention, when read in conjunction with the accompanying drawing.

BRIEF DESCRIPTION OF THE DRAWINGS

In the drawing:

FIG. 8 is a longitudinal cross-section of the reproduction apparatus, in which another embodiment of the device according to the present invention is incorporated;

FIG. 9 is a plan view of the device shown in FIG. 8;

FIGS. 12, 13 and 14 are, respectively, plan views showing an overlay, a list, and a slip for use in another embodiment of the device according to the present invention.

DETAILED DESCRIPTION OF THE PREFERRED EMBODIMENTS

Figure 1:
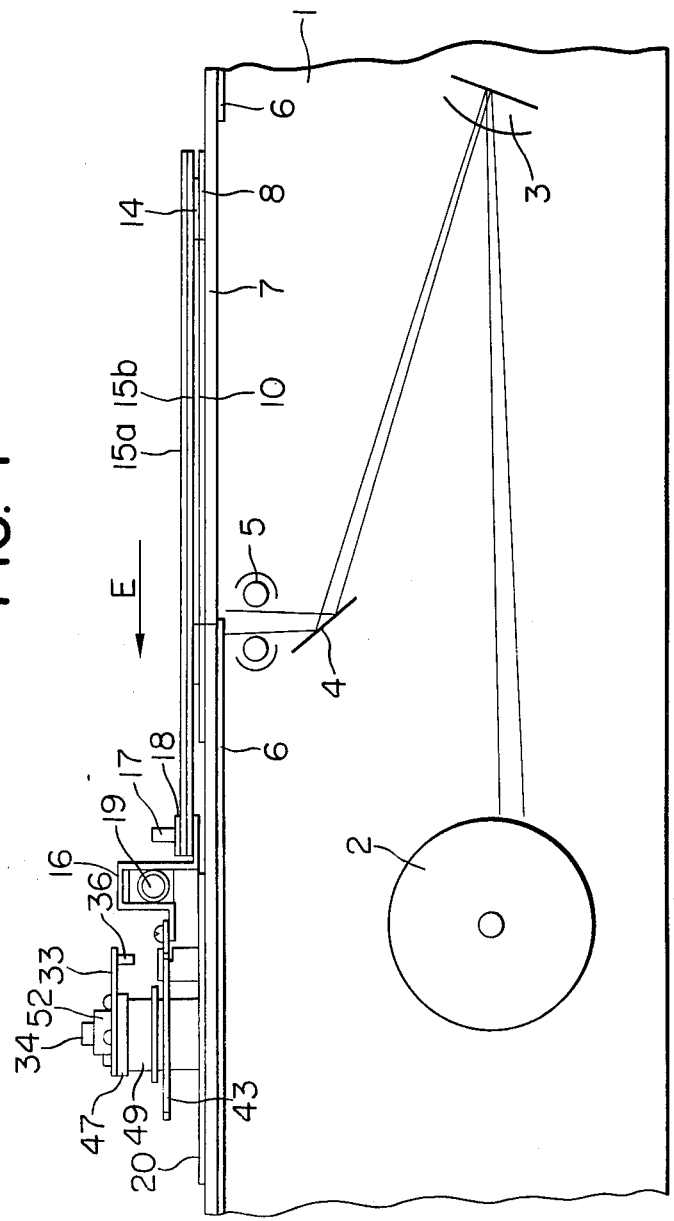
FIG. 1 shows a schematic view in longitudinal cross-section of a part of a reproduction apparatus, in which one embodiment of the device of the present invention is incorporated.
Figure 2:
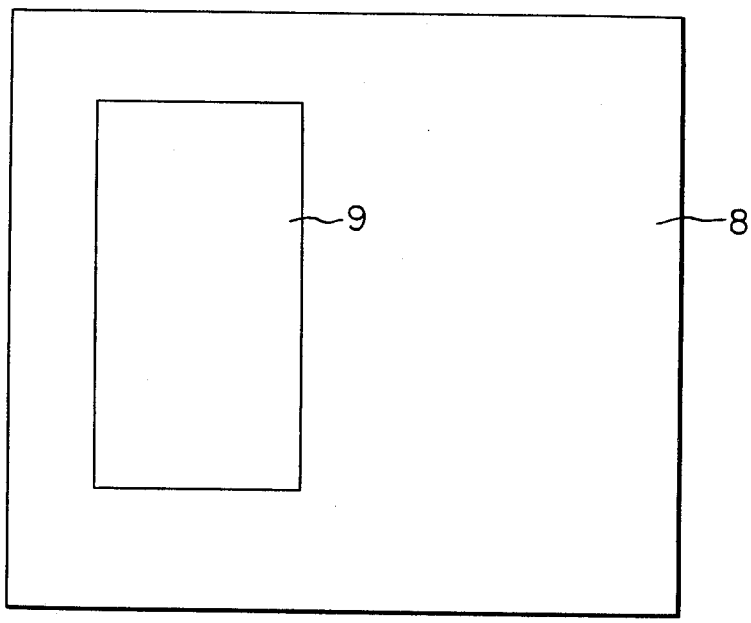
FIGS. 2, 3 and 4 are, respectively, plan views showing an original information carrying (or placing) table, an overlay, and a list of customers, etc., for use in the successive reproduction, each constituting the component part for the device of the present invention.
Figure 3:
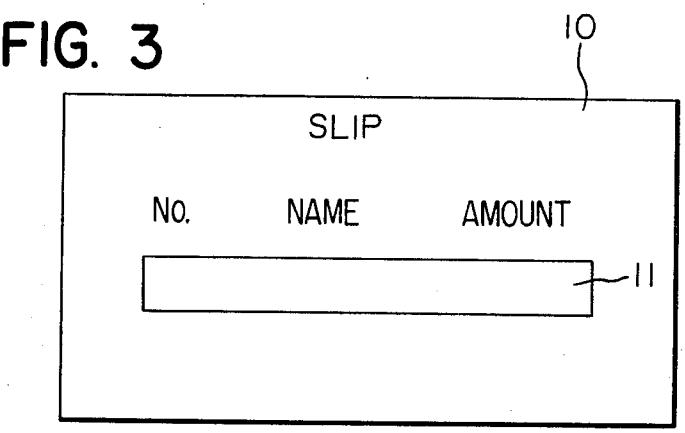
Figure 4:
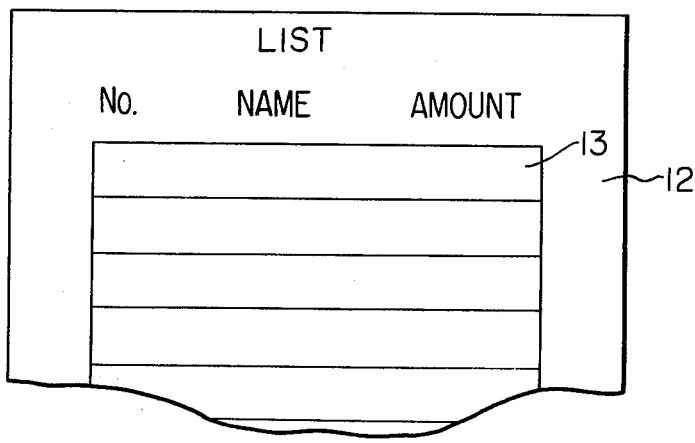

Referring to FIG. 1, the reproduction apparatus comprises an apparatus main body 1, a photosensitive drum 2, a lens system 3, a reflection mirror 4, a lamp 5 for illuminating an original to be reproduced, and a transparent glass plate 7. Since the glass plate 7 is fixed on a base plate 6 for an original carrying table 8, any information placed thereon is sequentially transferred onto transfer paper through the photosensitive drum 2 along with movement of the original carrying table 8. The original carrying table 8 is fitted on the transparent glass plate 7 in a readily removable manner. An overlay 10 is inserted into a window 9 formed in the original carrying table 8 (see FIG. 2) leaving a clearance to such an extent that no dislocation thereof may take place even by a shock caused by movement of the original carrying table 8. The overlay 10 is in such a construction that, when necessary, it may be easily replaced or exchanged with another type of overlay by pulling up one end of the original carrying table 8. The overlay is printed thereon with fixed informations (or entries), and is further provided with a cut-out window portion 11, in which an entry 13 in the list 12 shown in FIG. 4 with an information required to be changed being described is caused to appear through the cut-out window portion 11. On the top surface of the original placing stand 8, there are provided 2 sheets of transparent plates 15a, 15b having a certain degree of elasticity (e.g., transparent, hard vinyl resin) through a spacer 14. The list 12 is so designed that, when it is inserted between these two transparent plates 15a, 15b, each of the entries 13 therein may readily appear at the cut-out window portion 11 of the overlay 10. Since the spacer 14 and the transparent plate 15b are both made sufficiently thin, there is provided a substantially similar effect to that as if a single line of the entry in the list were directly printed on the portion of the overlay where the cut-out is formed.

The transparent plates 15a, 15b are fitted at their one end to a dowel 17 fitted onto a movable plate 16 and tightened there by a fixing plate 18, whereby, when the movable plate 16 moves along a shaft 19 back and forth, as viewed from the top face of FIG. 1 of the drawing, the transparent plates 15a, 15b move along with the movable plate 16.

The movement of the movable plate 16 will now be explained in the following in reference to FIG. 5. The shaft 19 is supported at its both ends by brackets 21a, 21b secured on a plate 20 which in turn is fixed on the top surface part of the apparatus main body 1. The brackets 21a, 21b also serve as stoppers for the movable plate 16. A lever 23 which is made swingable on the pivot of a dowel 22 fixed on one part of the plate 20 oscillates between stoppers 24a, 24b. The lever is also biassed to one direction by a stabilizing spring 25 so that it may restore to its position as indicated with a solid line, when an external force to the lever 23, by which it is turned to a position indicated with a dotted line, is removed. On one end part of the lever 23, there is fixed a dowel 26 which slides within and along a groove 28 formed in one end part of a lever 27. The lever 27 and another lever 29 are smoothly and independently rotatable on a common dowel 30 as the center. In a state, wherein no external force is applied to the lever 23, both levers 27 and 29 are pulled toward each other by a spring 31 and kept at a certain definite position by means of a stopper 32. A further lever 33 is freely rotatable around a shaft 34 fixed on the plate 20 as the center. A groove 35 is cut-out in one end part of the lever 33 along its longitudinal direction. At one appropriate position in the groove 35, there is fixedly provided a dowel 36 by means of a nut, which slides smoothly in and along a groove 37 formed in the other end of the lever 27. A lever 38 is rotatable around a boss 39 fixed on the plate 20, and is held at a certain definite position by a spring 40 and a stopper 41 when no external force is applied to the lever 23. At one end of the lever 38 opposite to the end where the spring 40 is hooked, there is provided a pawl 42 at its tip. The lever 38 forms a clutch structure together with a gear 43 beneath it (see FIG. 6), and, only when the lever 23 rotates in the arrow direction A in FIG. 5, the gear 43 rotates in the arrow direction B in unitary structure. Upon rotation of the gear 43, a rack 44 fixed on the movable plate 16 and meshed with the gear 43 moves in the arrow direction C whereby the list 12 interposed between the transparent plates 15a, 15b moves. When the rack 44 moves in the arrow direction C and its rightmost end reaches the gear 43, no further movement of the rack is effected, even if the gear continues to rotate, because a notched portion 45 is formed at the rightmost end part of the rack 44. For preventing the rack 44 from rocking, there are provided guide plates 46a, 46b.

Figure 5:
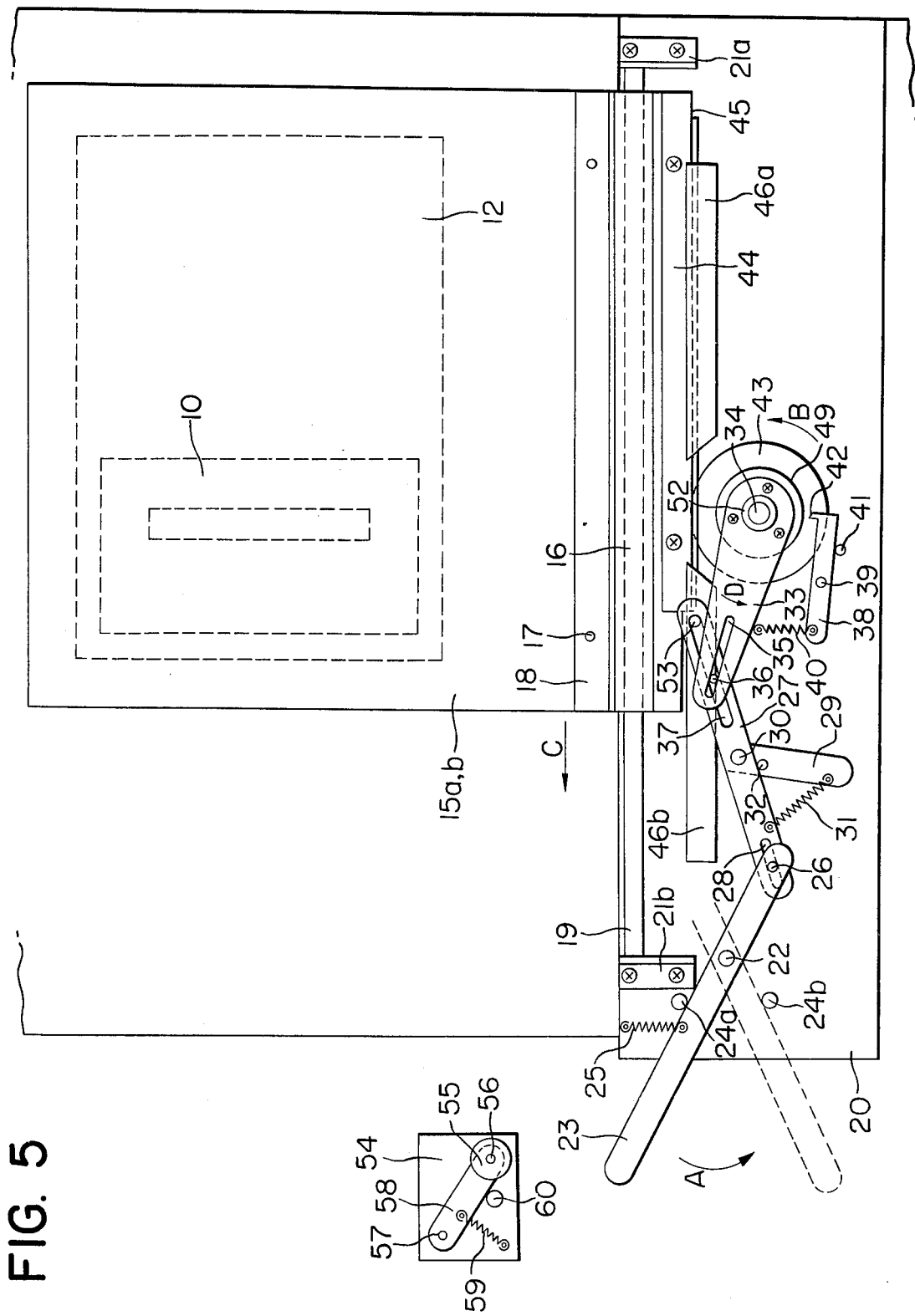
FIG. 5 is a plan view for explaining the structural functions of the device of the present invention, when it is placed on the original placing table.
Figure 6:
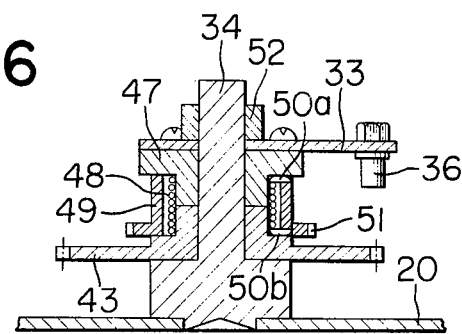
FIG. 6 is a longitudinal cross-section of the clutch of the device according to the present invention.

In FIG. 6, a ring 47 is fixed to the lever 33, and mounted on the same axle 34 together with the gear 43. Around the periphery of these concentrically mounted ring 47 and gear 43, a clutch spring 48 is wound. Further, on the outer periphery of the ring 47 and gear 43, and over the spring 48, there is disposed a control ring 49 free from the ring 47 and the gear 43. The control ring 49, in its longitudinal cross-section, is in a symmetrically paired letters L, and is provided in its top and bottom surfaces with notched portions 50a, 50b, into which both ends of the clutch spring 48 are engaged. Further, at the outermost periphery of the flanged portion of the L-shaped ring 49, there is formed a gear 51 which is engageable with a pawl 42 of the lever 38. Since the clutch spring 48 is wound in the rightward direction, when the lever 33 oscillates in the arrow direction D in FIG. 5, the gear 43 rotates in the same direction so far as no external force is applied to the control ring 49. However, when the teeth 51 formed on the outer periphery of the flanged portion of the control ring 49 is engaged with the pawl 42 of the lever 38, and the control ring per se stops its rotation, the clutch mechanism is released because one end of the clutch spring 48 is engaged with the notched portion 50a of the control ring 49, whereby the gear no longer performs its rotation even if the lever 33 continues rotation, and is thereby kept in a stopped condition. On the other hand, when the lever 33 rotates in the opposite direction to the arrow direction D, the clutch does not work, whereby the gear remains as it stands still.

As already mentioned, since one of the ends of the clutch spring 48 is engaged with the notched portion 50b of the control ring 49, if the ring is pressed by the movement of the lever 33, the gear 43, which is the driven part of the clutch, becomes freely rotatable in both directions, whereby the movable plate 16 becomes able to be shifted to any appropriate position. Incidentally, a stopper 52 is provided to prevent the clutch from moving in the axial direction thereof.

Figure 7:
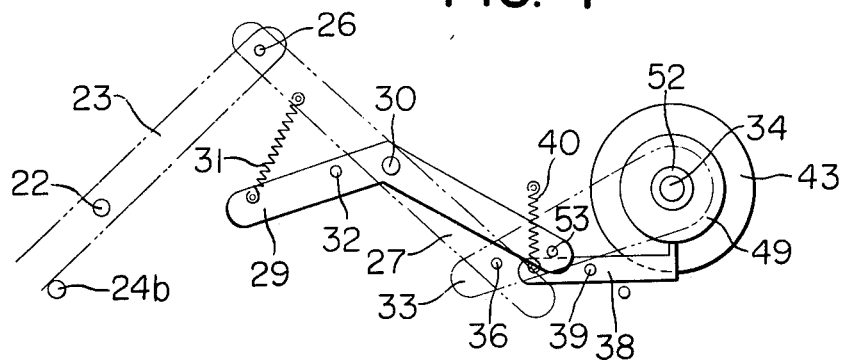
FIG. 7 is an additional explanatory diagram for the structural function of the device shown in FIG. 5.

In FIG. 5, when the lever 23 oscillates in the arrow direction A, the levers 27 and 29 also oscillate in correspondence to the lever 23. The lever 33 receives the oscillating motion of the lever 27 through the dowel 36 and moves in correspondence thereto. In this case, if the dowel 36 is fitted outside the center of rotation of the lever 33, the rotational angle thereof is small, while when it is fitted inside the center of rotation, the angle becomes large. Since the dowel 36 can be easily fitted in the groove 35 of the lever 33 by a nut, the rotational angle of the lever 33 can be arbitrarily varied in correspondence to one reciprocating motion of the lever 23, whereby the forwarding quantity or distance of the movable plate 16 can be determined appropriately. Now, if this one reciprocating motion of the lever 23 is caused to meet one line of the entries 13 in the list 12, it becomes possible to readily adjust the line space in the entries of the list which differs from bank to bank without exchanging the component part at each time. When the lever 23 comes closer to the position indicated by the dotted line in FIG. 5, the dowel 53 fitted to the lever 29 contacts the lever 38. Upon further rotation of the lever 23, the lever 38 is caused to rotate in the counterclockwise direction by the dowel 53, whereby the pawl 42 provided at the tip end thereof is engaged with the teeth 51. At this point, the gear 43, which is the driven part of the clutch, is brought into a stopped state, and does not rotate until it oscillates to a position where it contacts the stopper 24b. As soon as the lever 38 becomes engaged with the control ring 49, the lever 29 becomes incapable of its rotation thereafter, on account of which the lever 27 continues its rotation in the direction, where the spring 31 is stretched, and finally stops at a predetermined position. This state is illustrated in FIG. 7. In order to secure the abovementioned operations, the spring 31 is made sufficiently stronger than the spring 40.

Considering now a case where the lever 23 is being returned to the stopper 24a in the direction opposite the arrow direction A by means of the spring 15. The lever 27 is, first of all, returned until it contacts the stopper 32 of the lever 29, after which both levers 27 and 29 are returned in correspondence to the lever 23 in an integral structure by means of the spring 31 and the stopper 32. When the lever 29 is returned in the counter clockwise direction, the lever 38 which has so far been confined by the dowel 53 is also returned by the spring 40 until it contacts the stopper 41 in accordance therewith. By the afore-described operations, forwarding of one line of the list 12 is carried out. Thereafter, by repetition of the similar operations, required number of lines can be forwarded stepwisely (stepping movement). For the stepping motion of the movable plate 16, utilization of the moving function of the original carrying table is advantageous. In order to put this stepping motion into effect, a bracket 54 is fitted on a corresponding position of the stationary main body of the reproduction apparatus, a roll 55 is made rotatable on a dowel 56, and the dowel 56 is in turn fitted at one end of a lever 58 which is oscillatable with an axle 57 as the center and is made restorable to a position of a stopper 60 by a spring 59 hooked on the lever 58.

On movement of the original carrying table in the arrow direction E in FIG. 1, the reproduction operation is effected. At this point, the list 12 should be at a definite position and one line of the entries 13 thereof should exactly correspond to the cut-out window portion 11 of the overlay 10. It is therefore desirable that the stepping motion of the movable plate 16 be performed at the time of the return motion of the original carrying table. In the present invention, the bracket 54 is provided in such a manner that the stepping motion of the movable plate 16 may be carried out immediately prior to return of the original carrying table to its starting position, and the states of the levers when the table is at its starting position may be such as shown in FIG. 7. At this time, since the control ring 49 is restrained by the lever 38, the movable plate 16 can be manually set at an appropriate position. In this way, it becomes possible to readily place the list 12 on any appropriate position without requiring any sort of operation whatsoever from outside. Replacement of the list 12 for another can be done simply by pulling up the right end of the transparent plate 15a as shown in FIG. 1, when it is made of a pliable material. Similarly, replacement of the overlay 10 can be performed easily by pulling up the right end of the original carrying table 8, when the transparent plate 15b is also made of a pliable material. When the fitting between the fixing plate 18 and the dowel 17 is made in such a construction that they may be readily disengaged, the transparent plates 15a, 15b can also be removed easily. Further, when the original receiving table 8 is also made removable, or it is made in a hinged structure at its left end in FIG. 1 so as to be rotatable in the counter clockwise direction, it can be utilized as an ordinary reproduction machine without dismantling other component parts.

Another embodiment of the device according to the present invention will be described hereinbelow in reference to FIGS. 8 through 14.

As shown in FIGS. 9 and 12, two window openings are formed in an overlay 61 and the space interval therebetween is made to correspond to n numbers of lines of entries 63 in the list 62, whereby a sheet of slip 64 containing therein two different entries as shown in FIG. 14 can be reproduced. When this sheet of slip 64 is cut along a cutting line 64c, two independent sheets of slip 64a and 64b can be finally obtained. Upon completion of one reciprocating motion of the original carrying table, a subsequent new line of the entries 63 in the list 62 must appear through each of the window openings 65 in the overlay 61. This slide-moving operation will be more specifically explained in reference to FIGS. 8 to 11.

That is, the movable plate 66 is made movable along a shaft 68 on the base plate 67 fixed on the original carrying table. Further, in order for this movable plate 66 to move smoothly without causing play in its movement, a roller 69 which rolls smoothly along a groove of the base plate 67 is provided. At one end of the movable plate 66, there is fitted a rack 70 which is engaged with an idler gear 71. The idler gear 71 is in turn meshed with a gear 73 rotating around an axle 72 as the center of its rotation. Further, an axle 74 is fixed on the base plate 67, around which a lever 75 is rotatably fitted as the center of its oscillation. A lever 76 is mounted on a ring 77 which rotates around the abovementioned axle 72 as the center, and the ring 77 is coupled with the gear 73 having a built-in clutch mechanism in the clutch construction. Since the levers 75 and 76 are connected to each other by a dowel 78 fitted on the lever 76, when the lever 75 rotates in the arrow direction F in FIG. 9, the gear 73 rotates accordingly in the arrow direction G and the movable plate 66 moves in the arrow direction H. On the other hand, when the lever 75 rotates in the opposite direction by a spring force, the gear 73 does not rotate because of its unidirectional clutch construction, and the movable plate 66 remains stationary. By changing the position of the dowel 78, it is possible to coincide the forwarding amount of a single line of the entries 63 of the list 62 with a single reciprocating motion of the lever 75. In a state of the original carrying table having returned to the starting position, the position of the lever 75 will become as shown by a dash line due to a stopper roll provided at the fixing side. An idler gear 71 and a releasing roller 80 are fitted on a plate 81 which is rotatably disposed around the axle 72 as the center in a manner to be completely independent of the gear 73 and the lever 76. When a release button 82 is pushed in the arrow direction I, the release roller 80 receives its pushing force through a plate 83 which moves in unison with the release button 82, whereby the plate 81 rotates in the anti-clockwise direction. As the result, engagement between the idler gear 71 and the rack 70 is released, and the movable plate 66 can be returned to any appropriate position by manual operation.

By repetition of the abovementioned operations, required number of desired copies can be obtained in correspondence to one reciprocating motion of the original carrying table of the reproduction apparatus.

Figure 10:
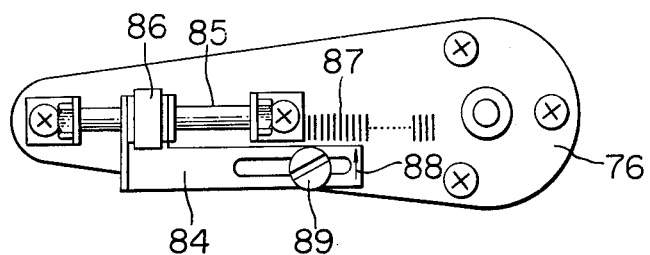
FIGS. 10 and 11 are respectively a plan view and a side elevational view showing fractional details of the device according to the present invention.
Figure 11:
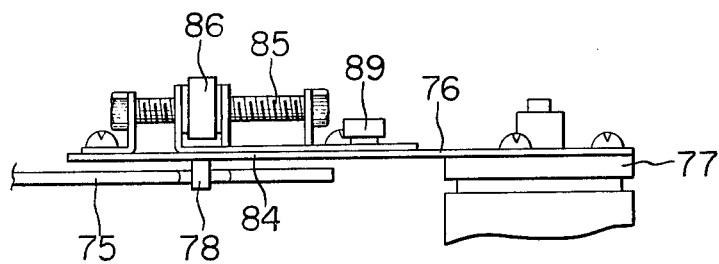

Now, as shown in FIGS. 10 and 11, when the dowel 78 is fixed on a plate 84, a screw-threaded shaft 85 is fixed on the lever 76, and the plate 84 is caused to move along the screw-threaded shaft 85 by means of a knob 86 having the corresponding female screw-threaded portion to that of the screw-threaded shaft 85, the position of the dowel 78 can be varied extremely easily. As the dowel 78 is shifted by turning the knob 86, its precision is required to be sufficiently high. As one expedient, when index lines 87 and 88 are provided on the lever 76 and the plate 84, respectively, any decrease or increase in the moving amount of the movable plate 66 which corresponds to the space interval of the index lines 87 should be in a definite proportional relationship. Consequently, even when several different degrees of moving distances are required, the position setting of the dowel 78 can be easily effected in accordance with the particular moving quantity. Incidentally, the plate 84 is fixed by a tightening screw 89 so that the dowel 78 may not get out of its set position by the movement of the lever 76.

As described in the foregoing, the successive reproduction device according to the present invention possesses very unique features, so that it is perfectly suited for the primary purpose of office works such as manpower saving, automation, and increase in working efficiency in producing slip forms for use in various companies and organizations such as banks, etc. At the same time, as the forwarding (or shifting) quantity of a list containing entries to be sequentially reproduced can be easily varied, preparation of more than two kinds of slip forms containing therein different entries from the list can be done very easily, and extremely advantageously. Moreover, the device can be used an an ordinary reproduction apparatus, which is very convenient.

Although the present invention has been described in particular reference to preferred embodiments thereof, it should be understood that these embodiments are merely illustrative and not so restrictive, and that any change and modification may be effected by those skilled in the art without departing from the spirit and scope of the present invention as set force in the appended claims.

What is claimed is:

1. A device for forming successive reproductions, wherein said device includes a reciprocating original carrying table, and comprises in combination:
   an information support table disposed for reciprocal movement for being positioned over said original carrying table to permit reproductions to be made of said information;
   means for moving said movable table to change the said information to be reproduced by successively shifting said movable table over said original carrying table, wherein said moving means comprises a plurality of at least three interconnected links, one of said links being coupled to said original carrying table to transmit a driving force of said carrying table to move said movable table; and
   means including another of said links engaged with said one link for varying the distance of said shifting movement of the movable table, wherein said distance is varied by changing the point of engagement between said engaging links.

2. The device as claimed in claim 1, wherein said information support table is freely mounted on and detachable from said original carrying table.

3. The device as claimed in claim 1, wherein said information support table is hinged at its one end to said original carrying table.

4. The device as claimed in claim 1, further comprising means for making fine adjustments of said engaging point of said links.

5. The device as claimed in claim 1, wherein said moving means is releasably coupled to said information support table to enable said support table to be manually shifted to any desired position.

6. The device as claimed in claim 1, comprising means for controlling the said change of information by shifting said supporting table during a selected one of a forward and a return movement of said original carrying table.

7. The device as claimed in claim 1, further comprising means for simultaneously changing a plurality of information entries on said information support table.

8. The device as claimed in claim 6, wherein said moving means includes a unidirectionally controllable clutch for permitting said shifts of said information support table only at the time of a return motion of said original carrying table.

* * * * *